Reissued Jan. 14, 1930 Re. 17,563

UNITED STATES PATENT OFFICE

GEORGE W. RAIZISS, OF PHILADELPHIA, PENNSYLVANIA, ASSIGNOR TO ABBOTT LABORATORIES, OF NORTH CHICAGO, ILLINOIS, A CORPORATION OF ILLINOIS

PROCESS OF PRODUCING A MERCURY COMPOUND OF 4-NITRO-ORTHO-CRESOL AND THE PRODUCT THEREOF

No Drawing. Original No. 1,554,293, dated September 22, 1925, Serial No. 723,685, filed July 9, 1924. Application for reissue filed August 7, 1929. Serial No. 384,229.

The object of my present invention, in research laboratory work, has been to produce a mercury derivative of 4-nitro-ortho-cresol, never before obtained, and which is specifically a mercury derivative of 4-nitro-ortho-cresol, as distinguished from the mercuri derivative of 3-nitro-ortho-cresol which forms the subject matter of my Patent No. 1,630,072, dated May 24, 1927, the latter being a crystalline product, while my present new product is an amorphous powder. Both of them possess superior germicidal properties and hence give valuable therapeutic effects when such a medicinal remedy is indicated.

The investigations of Otto N. Witt, E. Notting, and E. Grandmougin, published in the Berichte der Deuts. Chem. Gesellschaft, volume 23, 1890, page 3635, and also of O. Michel and E. Grandmougin, published in the Berichte Deutschen Chemischen Gesellschaft, 26, III, 1893, page 2349, show that 4-nitro-ortho-cresol is difficult to obtain pure. A considerable amount of impurity called by the above author nitro-indazol is ordinarily obtained. In order to omit the troublesome complete removal of the impurity nitro-indazol, I found a procedure by which the 4-nitro-ortho-cresol is mercurated, while some impurity of nitro-indazol is present in it. I observed that a mixture of mercury derivatives can be separated, based on the property that the mercury derivative of 4-nitro-ortho-cresol forms soluble salts with alkali metal hydroxides, in which group is to be included as customary, ammonium hydroxide.

The mercury derivative of nitro-indazol is insoluble in a solution of the same reagent. After separating the two mercury derivatives in this way, the desired mercury compound of 4-nitro-ortho-cresol can then be regained from the alkali metal salt solution by acidifying with acetic acid and precipitating out the compound. In order to make this process practicable, it is necessary to prepare the 4-nitro-ortho-cresol in such a way as to avoid the formation of the nitro-indazol impurity in too large amounts. While the process of making of 4-nitro-ortho-cresol has been amply described in the literature, the following method is preferable to the process described in the literature:

*Preparation of 4-nitro-ortho-toluidine*

Sixty-seven kilograms of concentrated sulphuric acid are cooled to 0° C.; while the acid is being stirred by a mechanical stirrer, to it are added in a slow stream 6.1 kilograms of ortho-toluidine and the temperature is not allowed to rise over 10° C. After all the toluidine has been added, the mixture is cooled to −2° C. To this is added, drop by drop, a nitrating mixture of 3.6 kilograms of nitric acid and 4 kilograms of sulphuric acid. While nitrating, the temperature should not rise above −1° C. When all the nitrating mixture has been added, allow the mixture to be mixed for one-half hour at about 0° C. This is then crystallized by pouring the mixture in 180 pounds of cracked ice. Permit it to crystallize for 12 hours. Filter and wash several times with ice cold water. About 40 liters of water are used for washing the quantity obtained.

The crystalline precipitate, which is ortho-nitro-toluidine sulphate is dissolved in 80 liters of boiling water and cooled to 70° C., and 40% sodium hydroxide solution is added until slightly alkaline to litmus paper. Now cool to 15° C. and filter the precipitate formed, which is 4-nitro-ortho-toluidine, wash with cold water until free of sulphates and dry it at ordinary temperature.

*Preparation of crude 4-nitro-ortho-cresol*

3.2 kilograms of 4-nitro-toluidine are dissolved in a very hot solution obtained by mixing about 36 liters of water with 6.4 liters of concentrated sulphuric acid. Diazotize hot (about 90 to 100° C.), stirring rapidly and injecting live steam, by adding gradually and slowly in a continuous stream a solution of 1.5 kilograms of sodium nitrate in 10 liters of water.

After all the sodium nitrate solution has been added, the injection of steam and rapid stirring continues for about one-half hour. The total volume of the resulting liquid is now about 120 liters. Nitro-indazol is also formed which appears as a black tarry oil, is allowed to separate out, and is removed. The yellow liquid, containing 4-nitro-ortho-cresol, and which has been separated from the nitro-indazol as much as possible, is cooled, whereupon yellow crystals are obtained. The crystallization is completed upon standing for 12 hours. The crystals are filtered off and washed with 40 liters of cold water and then dried in the air without application of heat.

*Preparation of 4-nitro-ortho-cresol mercury compound*

110 gms. of 4-nitro-ortho-cresol containing some nitro-indazol not completely removed, is dissolved in a mixture of 4,000 cc. hot water and 100 cc. of 40% sodium hydroxide solution. To this is added in a slow stream 220 gms. of mercuric acetate, which has been dissolved in 1,500 cc. boiling water, containing a small amount, say 10 cc. glacial acetic acid. This mixture is stirred mechanically and kept at a temperature close to 100° C. for two hours. Forty per cent sodium hydroxide solution is then added drop by drop for the purpose of neutralizing the acetic acid present. At this point a heavy precipitate is formed. This precipitate of mercury compounds consisting of a mixture of the mercury derivative of 4-nitro-ortho-cresol and mercury derivative of nitro-indazol is filtered out, while the mixture is yet hot. The product is washed with about 5 liters of boiling water. In order to separte the mercury derivative of 4-nitro-ortho-cresol from the mercury derivative of nitro-indazol the above precipitate is extracted, several times by means of hot aqueous solution of alkali (75° C.) using altogether approximately 10 liters of water, containing about 250 gms. of sodium hydrate, or about 250 gms. KOH. The combined extracts containing the mercury derivative of 4-nitro-ortho-cresol is cooled to 15° C. A small amount of a precipitate representing an unidentified impurity is formed on cooling, and is filtered off. The clear solution is then acidified with acetic acid until it shows a neutral reaction tested on litmus paper. A precipitate of mercury compound of 4-nitro-ortho-cresol thus formed upon standing is then filtered off, washed thoroughly with hot water, methyl alcohol and ether and then dried on a steam bath. The resulting product is a brownish yellow powder insoluble in water but soluble in dilute aqueous alkali metal hydroxides, insoluble in methyl alcohol and ether. The following structural formula would probably represent it:

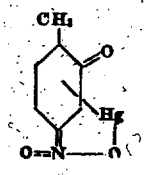

while the empirical formula of the compound is $C_7H_6O_3N\,Hg$.

The alkali metal salt of this compound can be made by suspending a quantity of it in hot water to which alkali metal hydroxide is added until the mercury compound of 4-nitro-ortho-cresol is dissolved. The solution is then poured into methyl alcohol and the product precipitated by the addition of ether. The precipitate is then filtered off and washed with ether and dried in vacuo. It is a reddish brown powder which is soluble in water, slightly soluble in methyl alcohol, and insoluble in ether. As an example of one of the alkali metal salts, the sodium salt is obtained by dissolving the mercury compound of 4-nitro-ortho-cresol in a quantity of hot water to which sodium hydroxide has been added. The solution is poured into methyl alcohol and the product precipitated by the addition of ether. The precipitate is filtered off and washed with ether and dried in vacuo. It is a reddish brown powder which is soluble in water, slightly soluble in methyl alcohol, and insoluble in ether.

I claim as my invention:

1. As a new composition of matter, a mercury compound of 4-nitro-ortho-cresol, which is a brownish yellow powder insoluble in water, methyl alcohol, and ether, but is soluble in a dilute aqueous solution of an alkali metal hydrate.

2. The method of preparing a mercury compound of 4-nitro-ortho-cresol, which comprises dissolving 4-nitro-ortho-cresol in a hot aqueous solution of an alkali metal hydroxide and reacting on the solution so formed with a hot acid mercuric acetate solution and neutralizing acid present by an alkali to precipitate the product.

3. The method of preparing a mercury compound of 4-nitro-ortho-cresol, which comprises dissolving 4-nitro-ortho-cresol in a hot aqueous solution of an alkali metal hydroxide and reacting on the solution so formed with a hot acid mercuric acetate solution, neutralizing acid present by an alkali to precipitate the product and purifying the product by dissolving it in an aqueous solution of an alkali and precipitating the purified product by neutralizing the solution with acetic acid, and separating the product.

4. The method of preparing a mercury compound of 4-nitro-ortho-cresol, which comprises reacting in the cold on ortho-toluidine with sulphuric acid, nitrating the mixture and crystallizing out ortho-nitro-toluidine sulphate, and converting the latter compound by alkali metal hydrate into 4-nitro-ortho-toluidine, diazotizing the later compound hot and forming 4-nitro-ortho-cresol and precipitating nitro-indazol, separating the solution, precipitating 4-nitro-ortho-cresol by cooling, reacting on 4-nitro-ortho-cresol in an aqueous alkali metal hydrate solution with a hot acid mercuric acetate solution and purifying the resulting precipitate by dissolving out the mercury derivative of 4-nitro-ortho-cresol with an alkali solution and neutralizing the separated solution with acetic acid to precipitate the purified product.

5. The method of preparing a mercury compound of 4-nitro-ortho-cresol, which comprises dissolving 4-nitro-ortho-cresol in a hot aqueous solution of sodium hydroxide and reacting on the solution so formed with a hot acid mercuric acetate solution and neutralizing acid present by sodium hydroxide to precipitate the product.

GEORGE W. RAIZISS.

CERTIFICATE OF CORRECTION.

Reissue Patent No. 17,563. Granted January 14, 1930, to

GEORGE W. RAIZISS.

It is hereby certified that error appears in the printed specification of the above numbered patent requiring correction as follows: Page 1, lines 94 and 96, for "nitrate" read nitrite; and that the said Letters Patent should be read with these corrections therein that the same may conform to the record of the case in the Patent Office.

Signed and sealed this 9th day of February, A. D. 1932.

M. J. Moore,
Acting Commissioner of Patents.

(Seal)

nitro-ortho-cresol in an aqueous alkali metal hydrate solution with a hot acid mercuric acetate solution and purifying the resulting precipitate by dissolving out the mercury derivative of 4-nitro-ortho-cresol with an alkali solution and neutralizing the separated solution with acetic acid to precipitate the purified product.

5. The method of preparing a mercury compound of 4-nitro-ortho-cresol, which comprises dissolving 4-nitro-ortho-cresol in a hot aqueous solution of sodium hydroxide and reacting on the solution so formed with a hot acid mercuric acetate solution and neutralizing acid present by sodium hydroxide to precipitate the product.

GEORGE W. RAIZISS.

CERTIFICATE OF CORRECTION.

Reissue Patent No. 17,563. Granted January 14, 1930, to

GEORGE W. RAIZISS.

It is hereby certified that error appears in the printed specification of the above numbered patent requiring correction as follows: Page 1, lines 94 and 96, for "nitrate" read nitrite; and that the said Letters Patent should be read with these corrections therein that the same may conform to the record of the case in the Patent Office.

Signed and sealed this 9th day of February, A. D. 1932.

M. J. Moore,
Acting Commissioner of Patents.

(Seal)